(12) United States Patent
Schneider et al.

(10) Patent No.: US 11,673,545 B2
(45) Date of Patent: Jun. 13, 2023

(54) METHOD FOR AUTOMATED PREVENTION OF A COLLISION

(71) Applicant: ZF Active Safety GmbH, Koblenz (DE)

(72) Inventors: Georg Schneider, Urbar (DE); Philipp Mungenast, Montabaur (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 115 days.

(21) Appl. No.: 16/515,062

(22) Filed: Jul. 18, 2019

(65) Prior Publication Data

US 2020/0023836 A1 Jan. 23, 2020

(30) Foreign Application Priority Data

Jul. 20, 2018 (DE) .......................... 102018117561.2

(51) Int. Cl.
  *B60W 30/09* (2012.01)
  *B60W 30/095* (2012.01)
  *B60W 50/00* (2006.01)
  *B60Q 9/00* (2006.01)
  (Continued)

(52) U.S. Cl.
  CPC ............ *B60W 30/09* (2013.01); *B60Q 9/008* (2013.01); *B60W 30/0956* (2013.01); *B60W 50/0097* (2013.01); *B60W 50/16* (2013.01); *B60W 2050/143* (2013.01); *B60W 2050/146* (2013.01); *B60W 2420/42* (2013.01); *B60W 2554/00* (2020.02)

(58) Field of Classification Search
  CPC ............ B60W 30/09; B60W 30/0956; B60W 50/0097; B60W 50/16; B60W 2554/00; B60W 2050/143; B60W 2050/146; B60W 2420/42; B60Q 9/008
  See application file for complete search history.

(56) References Cited

U.S. PATENT DOCUMENTS

| | | | |
|---|---|---|---|
| 2017/0101093 A1* | 4/2017 | Barfield, Jr. ..... | G08G 1/096775 |
| 2018/0141544 A1* | 5/2018 | Xiao ................... | G05D 1/0214 |
| 2018/0284785 A1* | 10/2018 | Berntorp ............. | G06N 3/08 |

FOREIGN PATENT DOCUMENTS

| | | |
|---|---|---|
| DE | 102011106176 | 2/2012 |
| DE | 102012009297 | 12/2012 |
| WO | 2017097486 | 6/2017 |

* cited by examiner

*Primary Examiner* — Nicholas Kiswanto
*Assistant Examiner* — Jamal A Shah
(74) *Attorney, Agent, or Firm* — Tarolli, Sundheim, Covell & Tummino L.L.P.

(57) ABSTRACT

In a method for automated avoidance of a collision of a vehicle with an object in the surroundings of the vehicle, multiple vehicle paths are predicted and each one is weighted with a vehicle path probability, the vehicle surroundings are recorded with an imaging vehicle sensor, an object in the vehicle surroundings is captured, at least one object path in the vehicle surroundings is predicted and is weighted with an object path probability, one of the vehicle paths is tested for collision with the at least one object path and if a collision is possible, a collision probability with the at least one object path is calculated, a weighting criterion for an overall collision probability of the vehicle with the object is ascertained and a test is performed of whether the (Continued)

weighting criterion exceeds a threshold and if the threshold is exceeded a collision avoidance maneuver is triggered.

17 Claims, 2 Drawing Sheets

(51) Int. Cl.
*B60W 50/16* (2020.01)
*B60W 50/14* (2020.01)

METHOD FOR AUTOMATED PREVENTION OF A COLLISION

RELATED APPLICATION

This application claims priority from German Application No. 10 2018 117 561.2, filed Jul. 20, 2018, the subject matter of which is incorporated herein by reference in its entirety.

BACKGROUND OF THE INVENTION

The invention relates to a method for automated prevention of a collision of a vehicle, such as a motor vehicle, in particular a passenger vehicle, with an object in the surroundings of the vehicle.

With the known automatic emergency brake system for city traffic, an infrared sensor system scans the area of the road surface in front of the vehicle and detects both stationary vehicles and vehicles driving in the same direction. If the distance from another vehicle appearing in the area of the road in front of one's own vehicle is less than a certain minimum, the vehicle is automatically braked to a stop.

Vehicles in which a driver assistance system takes over the driving of the vehicle from the driver, at least temporarily in certain operating situations, are also known. When a driver is temporarily relieved of the task of driving, his attention with respect to the traffic situation in the vehicle surroundings naturally drops.

Known driver assistance systems process driving tasks with the help of decision-making algorithms and regulating algorithms, which access data from one or more vehicle sensors as input variables.

Decision-making algorithms and regulating algorithms of known emergency brake systems and driver assistance systems operate with vehicle sensor data, but such data is subject to inaccuracies either as such or due to processing. If inaccuracies are not adequately taken into account in the system design, this can have a negative influence on the driving result.

There are known state-of-the-art driver assistance systems and methods that have been automated to prevent collision of a vehicle with other objects. However, this repeatedly results in driving maneuvers that cannot be implemented or results in a sudden sharp braking that does not appear necessary to the driver but is based on misinterpretations by such driver assistance systems.

SUMMARY OF THE INVENTION

The object of the present invention is to provide a method for automated prevention of collisions that will overcome the disadvantages of the state of the art, in particular to achieve a reliable collision prevention that can be implemented inexpensively.

This object is achieved by the method for automated prevention of collision of a vehicle such as a motor vehicle in particular a passenger vehicle with an object in the surroundings of the vehicle according to claim 1, in which a plurality of vehicle paths is predicted, and each path is weighted with a vehicle path probability, the vehicle surroundings are recorded by an imaging vehicle sensor, an object in the vehicle surroundings is detected, at least one object path in the vehicle surroundings is predicted and weighted with an object path probability, one of the vehicle paths is tested for collision with at least one object path, and, if a collision is found to be possible, the probability of a collision with the at least one object path is calculated, a weighting criterion for an overall collision probability of the vehicle with the object is ascertained, and a check is performed to ascertain whether the weighting criterion exceeds a threshold, and a collision avoidance maneuver is triggered if the threshold is exceeded.

For prediction of multiple potential vehicle paths, each weighted with a probability and taken into account in making a decision for the collision maneuver in accordance with this probability, the instantaneous driving situation of the vehicle is represented more comprehensively, which offers a robust basis for a decision. Likewise, another contributing factor is that the object path of an object detected in the vehicle surroundings is weighted with an object path probability. The method according to the invention achieves a low incidence of faulty deployment in that an evaluation criterion for the overall collision probability is formed by taking into account the various probabilities of the respective vehicle paths and object paths. The mathematical operations required to do so are basic operations, which do not make high demands of the automotive hardware used to carry out the method.

This method is implemented in particular by a driver assistance module in a vehicle, which includes a microcomputer and an interface with an object detection module in the vehicle. The imaging vehicle sensor is a camera module in particular, which produces a video data stream that is processed by the object detection module. Other vehicle sensors, which allow computer processing and representation of detected objects in two and three dimensions, can basically be used as imaging vehicle sensors. In particular a radar sensor, a lidar sensor, an ultrasonic sensor, a CMOS sensor, a CCD sensor or a combination of one or more of the aforementioned sensors may form the imaging vehicle sensor. The vehicle sensor generates a data stream, which is processed by the object detection module. Suitable algorithms that detect objects from the (video) data stream as well as their position relative to the vehicle and their speed relative to the vehicle and supply them for processing by the method are provided for object detection in the object detection module.

Objects in the sense of the present invention include all objects classified by the object detection module, in particular other traffic participants, pedestrians, cyclists, traffic signs, vehicles and/or buildings.

According to a preferred embodiment, the vehicle paths are determined from driving dynamic data and a probability of error distribution of the driving dynamics data. In particular, the vehicle speed, the wheel rotational speed, the yaw rate and/or the steering angle of the vehicle are scanned as driving dynamics data. In particular the vehicle paths are calculated by means of a parametric driving dynamics model. The vehicle paths are determined by variation of at least one parameter of the driving dynamics model. In particular, the parameter variation is derived from a probability distribution of an error or an inaccuracy in one or more driving dynamics sensors and/or the driving dynamics model. In particular, the probability distribution is given as a function of the deviation from the true driving dynamics data and/or the true vehicle path. The error probability distribution is obtained from a look-up table.

According to a preferred embodiment, multiple object paths are predicted, and each is weighted with an object path probability. In this process, one of the vehicle paths and one of the object paths are tested in pairs for the possibility of collision, and if a collision is found to be possible, that path is weighted with a collision probability.

According to a preferred embodiment, the object paths are ascertained from object capture data and an error probability distribution of the object capture data. In particular, the object capture data includes an object position and/or a relative speed of the object in relation to the vehicle. In particular, the error probability distribution indicates an error or an inaccuracy in the object capture data. In particular, an object path is calculated on the basis of the object position and/or relative speed of the object, and multiple object paths are calculated from the variation in the object position and/or relative speed according to the error probability distribution. In particular, specific error probability distributions are processed for object capture data of various types, such as the object position and relative speed and/or driving dynamics data of different types, such as the yaw rate and the steering angle, and corresponding additional vehicle paths or object paths are ascertained and weighted with corresponding probabilities.

According to a preferred embodiment, the collision probability is ascertained from the vehicle path probability and the object path probability. In particular the collision probability is determined only when a collision has been ascertained with respect to a specific pair of vehicle path and object path. In an alternative embodiment, the collision probability is set at zero if no collision has been ascertained. This has the advantage that all other calculation steps remain unchanged, and there need not be any additional treatment of non-colliding vehicle path and object path pairs. In particular, the collision probability is calculated by multiplying the respective vehicle path probability times the object path probability.

According to a preferred embodiment, the evaluation criterion for an overall collision probability of a vehicle is formed by addition of a plurality of collision probabilities. The evaluation criterion is formed in particular by adding up the collision probabilities of all pairs of vehicle paths and object paths.

According a preferred embodiment, the evaluation criterion is formed by a weighted summation of a plurality of collision probabilities. In particular, the collision probability of a respective pair of a vehicle path and an object path is weighted as a function of an object path property or an object class that has been detected. By means of this measure, it is possible to give less weight to object paths of a low probability in the collision consideration or to give more weight to objects that require protection, such as persons, in the evaluation of whether to deploy a collision avoidance maneuver.

According to a preferred embodiment, the evaluation criterion is formed by summation of a predetermined number of the highest collision probabilities. This is done by forming a ranking of path pairs on the basis of their collision probabilities and taking into account only the highest ranking and most probable path pairs for calculation of the evaluation criterion. In an alternative embodiment, the evaluation criterion is formed by summation of a predetermined number of randomly selected collision probabilities. With this measure, the computation time for this method step can be planned and limited reliably in advance.

According to a preferred embodiment, the vehicle path probabilities are tested for whether they exceed a threshold, and the collision probability is calculated only for vehicle paths that exceed the threshold. The vehicle path probabilities in this embodiment are preferably determined from an error probability distribution of the driving dynamics data calculated during the operation of the vehicle. In particular this test and restriction of the calculation to selected paths are also carried out alternatively or additionally for object path probabilities and object paths.

According to a preferred embodiment, several objects are detected in the vehicle surroundings, the objects are prioritized with respect to the other objects detected, and method steps d through g are carried out for a predetermined number of objects of the highest priority. The priority of an object is determined in particular on the basis of its object class, its position and its speed in relation to the vehicle. In particular, an overall collision probability is calculated for each object. The overall collision probabilities of the objects are preferably taken into account in selecting and planning a collision avoidance maneuver.

According to a preferred embodiment, the collision avoidance maneuver includes the fact that an audible, visible and/or tactile warning is output. Optical and/or acoustic warning signals in particular are presented to the driver of the vehicle. Additionally or alternatively, an exterior optical and/or acoustic warning may also be issued to other traffic participants, such as activation of the horn or the headlight flasher.

According to a preferred embodiment, the collision avoidance maneuver includes the fact that the speed of the vehicle is adjusted automatically by an automotive system. The automotive system is in particular a camera module, wherein a braking and/or acceleration target is transmitted, preferably immediately, via a vehicle communications network, to a brake control unit, a driving dynamics control unit and/or an engine control unit. In this embodiment, an emergency brake action is deployed directly by the camera module.

According to a preferred embodiment, the collision avoidance maneuver includes the fact that the vehicle is guided automatically along a path that does not intersect the at least one object path and/or along a path of a lower collision probability. The path for the collision avoidance maneuver is ascertained in particular by taking into account multiple detected objects and their respective potential object paths and their probabilities.

According to a preferred embodiment, the collision avoidance maneuver is triggered by a microprocessor integrated into a camera module and is predetermined by at least one automotive system. The automotive system is in particular a driving dynamics control unit, an engine control unit, a brake control unit or a central unit for automated driving functions.

BRIEF DESCRIPTION OF THE DRAWINGS

Additional advantages, properties and features of the invention will now be explained by the following description of preferred embodiments of the invention with reference to the accompanying drawings, in which.

DESCRIPTION

Figure 1:
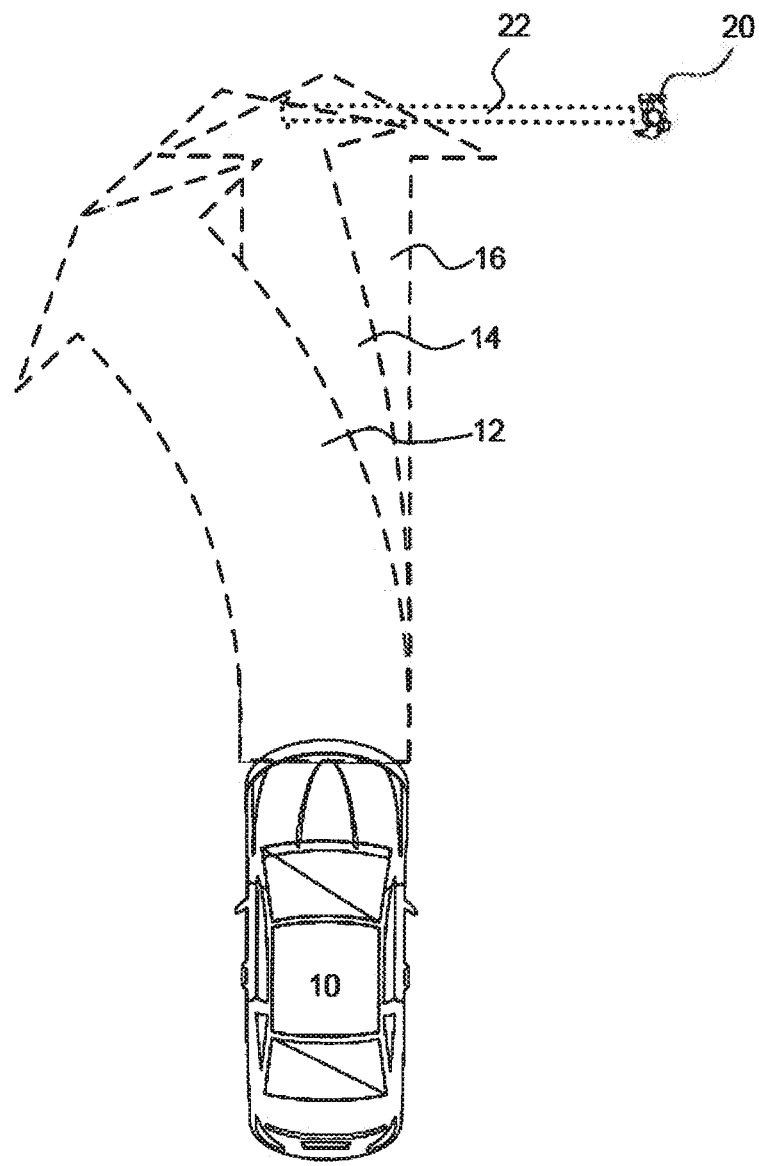
FIG. 1 shows a schematic diagram of a vehicle, for which the method according to the invention is explained on the basis of three vehicle paths and one object path in one first example.

FIG. 1 shows a vehicle 10 as an example. A preferred embodiment of the method according to the invention is implemented in a camera system in the vehicle 10, which is not illustrated in greater detail. In another embodiment, which is also not illustrated in greater detail, the method is implemented in a control unit for driver assistance functions that is separate from the camera system.

In this example, the camera system in the vehicle 10 comprises a region of the surroundings of the vehicle 10 in front of the vehicle in the direction of travel. An imaging sensor of the camera system supplies an image data stream, from which an object capture module that is integrated into the camera system detects an object 20, namely a pedestrian, and tracks it/him within the continuous data stream. The object capture module ascertains continuously from the image data stream the instantaneous position of the object 20 as well as its speed and direction of movement. The speed and direction of movement in particular are supplied as a velocity vector having at least two direction components. Based on the instantaneous position of the object 20, the speed and direction of movement, an object path 22 for a predetermined evaluation time horizon is extrapolated. A future position is calculated for multiple points in time in particular, and an object path 22 is formed from this data.

A predetermined time horizon for the vehicle path 16 is estimated for the vehicle 10 from instantaneous driving dynamics data, in particular the yaw rate, the steering angle, transverse acceleration and/or speed. A single-track model in particular is used for this estimate. Additional vehicle paths 12, 16 are estimated from the error probability distributions for the yaw rate, the steering angle, the transverse acceleration and/or the speed. A respective probability or reliability of the estimate of the respective vehicle path 12, 14, 16 is obtained from the error probability distribution of the driving dynamics data. For example, the estimated vehicle path 16 is weighted with a probability of 0.5, and the vehicle paths 12, 14 are each weighted with a probability of 0.25. In another embodiment, which is not described in greater detail, but is otherwise identical, the error probability distribution of the driving dynamics data also takes into account model inaccuracies in the single-track model or some other driving dynamic model that is used as well as the time dependence of the reliability of the estimate for future points in time of the time horizon.

In the simplified example of FIG. 1, only one object path 22 is estimated from the object capture data and weighted with a probability of 1.

The vehicle paths 12, 14, 16 are each tested for collision with the object path 22. To do so, the estimated positions of the vehicle along the respective vehicle path at the increments of the time horizon can be compared with the estimated positions of the object along the object path 22 and tested for correspondence. This comparison is always made in pairs for each vehicle path 12, 14, 16 and each object 20. If a correspondence of a vehicle path 12, 14, 16 and an object path 22 is ascertained within the time horizon, i.e., a potential collision of the vehicle 10 and the object 20 is ascertained, a collision probability is calculated for the respective vehicle path 12, 14, 16 and the object path 22. The collision probability is obtained by multiplying the vehicle path probability times the object path probability.

FIG. 1 shows the time horizon of the path estimate, represented by the length of the vehicle path arrows and the object path arrows. According to this figure, the object path 22 intersects the vehicle paths 16 and 14 but does not intersect the vehicle path 12. A collision probability of 1×0.5, i.e., 0.5, is obtained for the potential collision of the vehicle path 16 with the object path 22. A collision probability of 1×0.25, i.e., 0.25, is obtained for the potential collision of the vehicle path 14 with object path 22.

After calculating the collision probabilities of the potentially colliding paths, the evaluation criterion for the overall collision probability of the vehicle 10 with the object 20 is calculated by adding the collision probabilities of the colliding pairs of vehicle path and object path. In this example, the overall collision probability is 0.75.

In a simplified example, the overall collision probability is compared with a threshold value, e.g., 0.7. Since the overall collision probability exceeds the threshold, a collision avoidance maneuver is initiated. In another embodiment, which also corresponds to the embodiment in FIG. 1, the overall collision probability is monitored continuously, and characteristics of the curve of the overall collision probability, such as its slope or average over a predetermined period of time, are determined and compared with corresponding threshold values. In particular, the threshold is adjusted dynamically as a function of the driving situation.

In the simplest case, the vehicle is braked to a stop as quickly as possible as a collision avoidance maneuver. To do so, a microprocessor of the camera system, with which the collision avoidance method according to the invention is implemented, sends an emergency brake signal to a brake control unit.

In another embodiment, which corresponds to the example according to FIG. 1, unless otherwise indicated below, the microprocessor calculates a deviating trajectory for the vehicle. To do so, the vehicle 10 is controlled in such a way that the vehicle takes the potential vehicle path for which no collision with the object has been ascertained. The vehicle is thus controlled in such a way that there is an increase in the vehicle path probability for a collision-free vehicle path.

Figure 2:
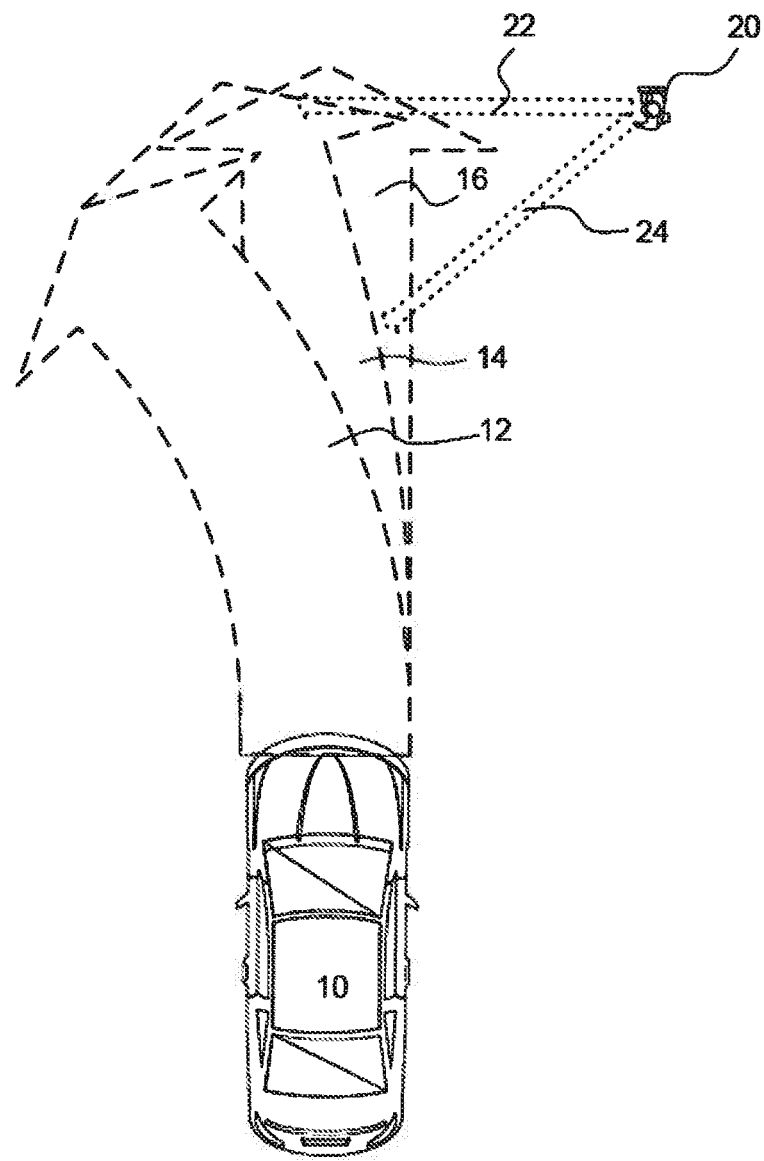
FIG. 2 shows a schematic diagram of a vehicle, for which the method according to the invention is illustrated on the basis of three vehicle paths and two object paths in the second example.

The embodiment of the method according to the invention represented in FIG. 2 is identical to the method represented in FIG. 1, so that the reference numerals and procedures correspond to the explanations given in conjunction with FIG. 1. One difference is that there is an error probability distribution for the instantaneous position of the object 20, its velocity and direction of movement. The error probability distribution yields a probability for a deviation from the respective true value of the instantaneous position, velocity and/or direction of movement of the object 20, as supplied by the object capture module. Thus for the object data, the probability of it deviating from the true values by a certain amount is thus known. With the help of the error probability distributions with respect to the instantaneous position, velocity and/or direction of movement, an error probability distribution can be given for the object path 22, based on the instantaneous position, velocity and/or direction of movement provided by the object capture module. Therefore, a probability can be assigned to the object path 22. Furthermore, additional object paths, namely those derived on the basis of object data deviating by a certain measure, are ascertained and weighted with a probability belonging to the deviation of the object data.

As an example and in simplified terms, in addition to the object path 22, which is ascertained on the basis of an instantaneous position and an instantaneous velocity vector, an additional object path 24, which is a potential object path because of the inaccuracy or deviations from the true value of the instantaneous position and the instantaneous velocity vector is also represented. On the basis of the error probability distribution, the object path 22 is weighted with a probability of 0.75, and the object path 24 is weighted with a probability of 0.25.

As shown in the example in FIG. 1, a vehicle path 12, 14, 16 and an object path 22, 24 are first tested in pairs for collision within the time horizon. Based on the length of the arrows in the schematic diagram, it can be seen in the example illustrated in FIG. 2 that the object path 22 intersects the vehicle paths 14 and 16, and the object path 24 intersects the vehicle path 16. If it is assumed that the vehicle path probabilities are the same as those in the example of FIG. 1, then the collision probability for the pair of vehicle path 16 and object path 22 is 0.5×0.75, i.e., 0.375, and the collision probability for the pair of vehicle path 14 and object path 22 is 0.25×0.25, i.e., 0.0625. For a collision of vehicle path 16 with object path 24, the collision probability is 0.25×0.25, i.e., 0.0625. The overall probability of a collision of vehicle 10 with object 20 is obtained as the sum of the collision probabilities of all pairs of colliding vehicle paths and object paths, i.e., 0.375+0.0.0625+0.0625. In another embodiment, which otherwise corresponds to the method as illustrated in FIGS. 1 and 2, the collision probability of the respective path pair before summation is influenced by a weighting factor. In particular, path pairs for which a collision was calculated at an early point in time within the time horizon have a greater weight than path pairs for which a collision was calculated at a later point in time in the time horizon. The weighting factor preferably decreases linearly over the time horizon.

The features of all the embodiments and variants described here may be combined in any desired manner as long as they are not contradictory or were explained as mutually exclusive alternatives.

LIST OF REFERENCE NUMERALS 10 vehicle
12, 14, 16 vehicle paths
20 object
22, 24 object paths

The invention claimed is:

1. A method for automated avoidance of a collision of a vehicle (10) with an object in the surroundings of the vehicle (10) in which:
   a) multiple vehicle paths (12, 14, 16) for the vehicle (10) are predicted based on driving dynamics data of the vehicle (10) and an error probability distribution of the driving dynamics data of the vehicle (10) and each is weighted with a vehicle path probability;
   b) the vehicle surroundings are captured by an imaging vehicle sensor;
   c) an object (20) is detected in the vehicle surroundings;
   d) at least one object path (22, 24) in the vehicle surroundings is predicted and is weighted with an object path probability,
   e) one of the vehicle paths (12, 14, 16) is tested for collision with the at least one object path (22, 24) and if a collision is possible, a collision probability with the at least one object path (22, 24) is calculated,
   f) a weighting criterion for an overall probability of collision of the vehicle (10) with the object (20) is ascertained and tested for whether the weighting criterion exceeds a threshold,
   g) a collision avoidance maneuver is triggered when the threshold is exceeded.

2. The method according to claim 1, wherein multiple object paths (22, 24) are predicted, and each is weighted with an object path probability, wherein one of the vehicle paths (12, 14, 16) and one of the object paths (22, 24) are tested in pairs for the possibility of collision and if a collision is possible that pair is weighted with a collision probability.

3. The method according to claim 2, wherein the multiple object paths (22, 24) are ascertained on the basis of object capture data and an error probability distribution of the object capture data.

4. The method according to claim 1, wherein the collision probability is ascertained from the vehicle path probability and the object path probability.

5. The method according to claim 1, wherein the weighting criterion is formed by summation of multiple collision probabilities.

6. The method according to claim 1, wherein the weighting criterion is formed by a weighted summation of multiple collision probabilities.

7. The method according to claim 1, wherein the weighting criterion is formed by summation of a predetermined number of selected collision probabilities.

8. The method according to claim 1, wherein the vehicle path probabilities are tested for exceeding a threshold and the collision probability is calculated only for vehicle paths (12, 14, 16) that exceed the threshold.

9. The method according to claim 1, wherein multiple objects in the vehicle surroundings are captured, a priority is assigned to a respective object with respect to the other objects captured and method steps d through g are carried out for a predetermined number of highest priority objects.

10. Method according to claim 1, wherein the collision avoidance maneuver comprises an audible, visible or tactile warning output by an automotive system.

11. Method according to claim 1, wherein the collision avoidance maneuver comprises a speed of the vehicle (10) being altered by an automotive system.

12. Method according to claim 1, wherein the collision avoidance maneuver comprises the vehicle being automatically guided along a path that does not intersect the at least one object path (22, 24) and/or along a path of a lower collision probability.

13. Method according to claim 1, wherein the collision avoidance maneuver is triggered by a microprocessor integrated into a camera module and is predetermined for at least one automotive system.

14. The method according to claim 1, wherein one of the vehicle paths (14) is predicted based on the driving dynamics data of the vehicle (10) and the remaining vehicle paths (12, 16) are predicted based on the error probability distribution of the driving dynamics data.

15. The method according to claim 1, wherein the remaining vehicle paths are estimated from the error probability distribution of at least one of a yaw rate, a steering angle, a transverse acceleration, and a speed of the vehicle.

16. The method according to claim 1, wherein one of the object paths (22) is predicted based on an instantaneous position and instantaneous velocity vector of the object and the remaining object path (24) is predicted based on an inaccuracy in the instantaneous position and the instantaneous velocity vector of the object.

17. The method according to claim 1, wherein each of the vehicle paths and the at least one object path are tested in pairs for collision and given a collision probability and the overall probability of collision is obtained by adding the collision probabilities of each of the tested pairs of vehicle paths and the at least one object path.

* * * * *